Oct. 30, 1962 F. L. JACOBS ETAL 3,061,438
TREATMENT OF GRAIN ALCOHOL
Filed Aug. 3, 1960
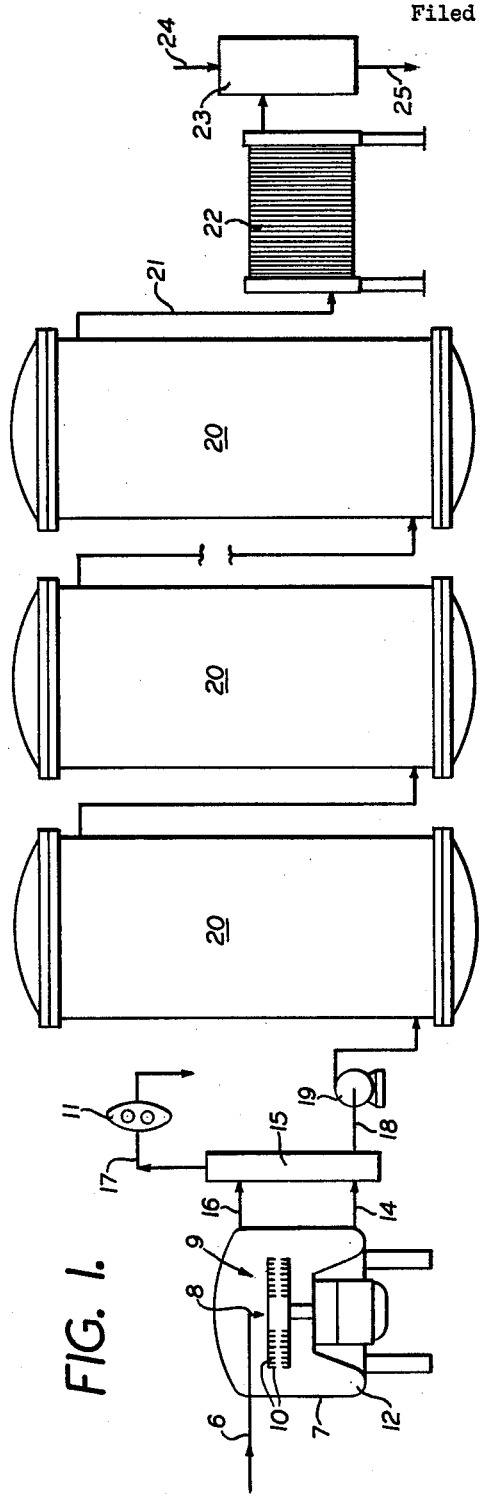
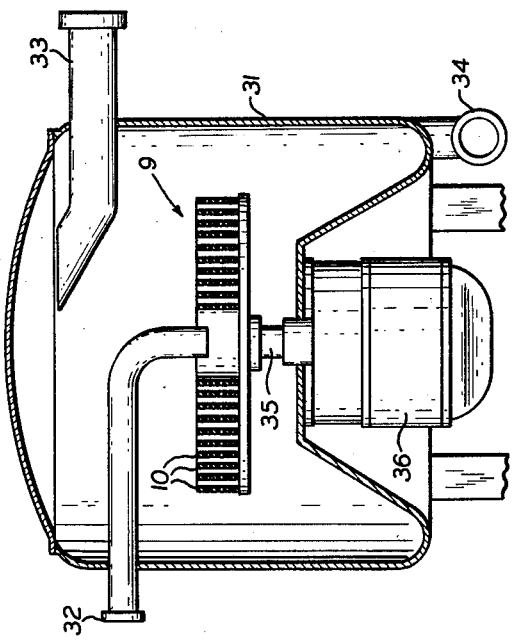
INVENTORS
FREDERICK L. JACOBS
JOSEPH A. PROCHASKA
BY
ATTORNEYS.

3,061,438
Patented Oct. 30, 1962

3,061,438
TREATMENT OF GRAIN ALCOHOL
Frederick L. Jacobs, Wethersfield, and Joseph A. Prochaska, West Hartford, Conn., assignors to Heublein, Inc., Hartford, Conn., a corporation of Connecticut
Filed Aug. 3, 1960, Ser. No. 47,243
9 Claims. (Cl. 99—36)

This invention relates to the treatment of grain alcohol to remove congenerics therefrom to improve quality as determined by organoleptic testing. The treatment according to the invention is useful, for example, in the manufacture of vodka.

Vodka is highly purified grain alcohol of usually about 80–110 proof. Grain alcohol suitable for vodka manufacture can be derived by purification of a beer obtained by fermentation of cereals, corn, barley, rice or potatoes. Following the fermentation, the beer is distilled in a beer still to separate the stillage. The beer still distillate is then subjected to a series of fractionation treatments to separate the low boiling components, usually considered aldehydes, and a high boiling cut or fusel oil. Thus, there is provided the grain alcohol as a middle cut of relatively high purity. At a proof of about 190–192, this middle cut is the grain neutral spirits of commerce.

The grain alcohol derived as a middle cut from the beer is not pure aqueous alcohol, although for practical purposes, in some arts, it can be considered to be pure. It contains, however, small amounts of different constituents which are collectively referred to as congenerics. In the art of production of alcoholic beverages, characteristic properties of the different beverages result from reaction of congenerics with each other or with the alcohol or by modification of the congeneric content. The characteristic properties of vodka are generally considered to be due to reduction of congenerics content so that odor, taste and color are minified.

In the manufacture of vodka, the manufacturing procedure consists essentially in treatment of the grain alcohol to reduce the congenerics content. This can be done, for example, by contacting the grain alcohol with charcoal or by extractive distillation.

While it might be thought that the arts of distillation, and purification by charcoal treatment have advanced to the point where it is possible to obtain grain alcohol of any desired low congenerics content, in the practical practice of the art it is found that this cannot be accomplished. Regardless of the care that is taken, there are always some congenerics present in the product. These may be in the form of a residual of the low boiling aldehydes or a residual of the high boiling fusel oils. The phenomenon precluding complete removal, or at least removal to a content less than that presently realized in the art is not understood. It may well be that intermolecular action, such as occlusion, cohesion and adhesion, and/or combinations of these actions, reduce the effectiveness of known methods of separation so as to preclude attainment of purification to the desired extent.

Another aspect of the practical art of vodka manufacture is that chemical analysis is not a suitable criterion for quality of the product, and in the final analysis the criterion of quality is not the tests of modern science, but rather on the sensitivity of the human organs for taste, sight and odor, i.e. organoleptic tests.

As noted above, a known procedure for production of vodka is contacting of vodka with charcoal to reduce congeneric content thereof. This contacting can be carried out by flowing grain neutral spirits through a series of beds of activated charcoal, whereby the grain alcohol is maintained in contact with the charcoal for several hours. The improvement in quality of the grain alcohol continues as contacting is prolonged. After a time, however, continued contacting is ineffective or uneconomical. The contacting time can be from 5 to 6 hours to 10 or 12 hours. While even shorter contacting periods provide improvement, it will usually be advantageous to continue for at least the 5 or 6 hours; and while longer times can be used, more than 10 or 12 hours is generally not desirable. A preferred contacting time is about 8 hours.

An alternative charcoal contacting procedure is to agitate a batch of grain alcohol having charcoal dispersed therein. In this procedure, the treating time, which is suitably based on cost and quality of product, is a period of hours, for example at least about 1 hour, and is usually shorter than the time for contacting in a fixed charcoal bed.

Optimum conditions such as temperature, etc., for the contacting with charcoal are known in the art. The temperature is advantageously 20–30° C. and the pressure is advantageously atmospheric. Activated charcoal, which includes fully activated as well as partially activated charcoal, can be employed.

It has been found that vodka made according to the above-described procedure, while being of high purity and constituting a generally satisfactory product, has a congeneric content which influences the taste of the vodka and that this cannot, as a practical matter, be significantly reduced by further treatment according to the known procedures, such as contacting with charcoal.

A principal object of the invention is to provide a procedure whereby improvement in respect to congeneric content, beyond that feasible employing charcoal and other known procedures, can be realized.

According to the invention, grain alcohol is treated to remove congenerics therefrom, and thereby minify odor, taste, and color thereof, by, for example, contacting the grain alcohol with charcoal or by extractive distillation, and in addition, the grain alcohol is treated to improve properties in respects aforementioned by dispersing the grain alcohol as fine drops while subjecting it to a reduced pressure.

Advantageously, the last mentioned step can be carried out by centrifuging the grain alcohol while simultaneously dispersing the grain alcohol as fine drops and subjecting it to a reduced pressure. This can be done by centrifuging the grain alcohol through a series of coaxially disposed perforated rings. In such operation, the grain alcohol is impinged by centrifugal force against a perforated ring, and as the alcohol passes through the perforations it is dispersed as drops. These drops are then thrown against the next outwardly adjacent ring whereupon the action is repeated, and so on until the alcohol has traversed through all of the perforated rings.

The charcoal treatment or extractive distillation step, which can be termed the known purification step, is relied upon to remove the bulk of the congenerics which are removed for the production of vodka. For example, this treating step is relied upon to remove congenerics in amount about equal to the amount of congenerics removed, thereby when, as has been done heretofore, this known purification step is relied upon as the only treatment for purification of the grain neutral spirits of commerce. The step of exposing the grain alcohol to a reduced pressure while in the form of dispersed drops is for the purpose of removing an increment of the congenerics which it is not practical to remove by the known purification step.

While the phenomenon responsible for the improvement resulting from the exposing of the grain alcohol in the form of drops to a reduced pressure is not surely known, it is believed to be attributable to removal thereby of low boiling congenerics and occluded gases. The known purification step of, for example, contacting with charcoal, is relied upon to substantially remove the high boiling congenerics such as fusel oils.

The improvement realized by the method of the invention, i.e. the combination of a treating step such as contacting with charcoal, and the treating step of exposing the alcohol in the form of drops to reduced pressure, is in respect to the taste of the product. This is a significant advance in the art of making vodka since the same improvement cannot feasibly be realized by merely increasing the time of the known purification step such as charcoal contacting. Yet the characteristic step of the method of the invention, i.e. dispersing the alcohol and simultaneously subjecting it to a reduced pressure, can be economically and conveniently carried out.

The treating step of the invention is not dependent on employment of particular treating conditions, and significant improvement is realized over a wide range of temperature and operating pressure. A suitable temperature for the operation is about 15–50° C. Preferably, the temperature is about 20–30° C. The reduced pressure to which the grain alcohol is exposed while dispersed as drops can be, in absolute units, 4–20 inches of mercury, and is preferably 8–12 inches of mercury. Residence time is not critical and is dependent on throughput in the equipment used. In general longer residence time provides improved results until a point of diminishing return is reached. Suitable residence times can be readily determined by experiment. While the proof of the alcohol subjected to the treating step of the invention is not critical, and can be up to 190 proof, the proof is preferably in the range of about 80–110.

In a preferred embodiment of the invention, the centrifuging or dispersing as fine drops while exposing to a reduced pressure, is carried out immediately before the known purification step, such as charcoal contacting. The method can be operated continuously.

The invention is further described in reference to the accompanying drawing in which:

FIG. 1 is a flow diagram for the manufacture of vodka according to the invention and employing as the known purification step charcoal contacting in charcoal beds; and FIG. 2 is a schematic representation of an apparatus suitable for dispersing grain alcohol in the form of drops and simultaneously subjecting it to a reduced pressure.

Referring to FIG. 1, 80–110 proof grain alcohol, obtained by diluting grain neutral spirits of commerce of proof 190–192, is passed through line 6 to the centrifugal vacuum purifier 7, and is deposited from the pipe 8 at the center of the centrifuge basket 9. As the grain alcohol is thrown radially outwardly in the centrifugal vacuum purifier, it is dispersed in the form of drops by the perforated ring 10, and simultaneously the grain alcohol is exposed to a reduced pressure which is maintained in the centrifuge by the wet vacuum pump 11. Following passage through the purifier basket 9, the grain alcohol collects in the annular trough 12 and leaves the purifier through outlet 14. The outlet 14 conveys the centrifuged grain alcohol to a standpipe 15, which serves as an entrainment separator for the gas stream drawn from the purifier by the vacuum pump 11. The gas stream outlet line 16 conducts the evolved gas to the entrainment separator and the separator is connected with the vacuum pump by line 17.

Alcohol leaves the entrainment separator 15 via line 18 and is pumped by pump 19 to and serially through a series of sorption chambers 20, each of which contains a charcoal bed. Sorption occurs upon passage of the alcohol through the charcoal beds and the alcohol leaves the charcoal treating chambers through line 21 which conveys the alcohol to filter 22. From the filter, the alcohol, freed of any solids present therein upon leaving the charcoal treatment, is passed to dilution tank 23, wherein water introduced through line 24 is used to dilute the treated alcohol as may be required to obtain the desired strength, which is usually in the range of 80–110 proof. The vodka produced then leaves the dilution tank through line 25.

The centrifugal vacuum purifier which has been found to be particularly well suited for the purposes of the invention is represented in FIG. 2. This purifier is commonly used for centrifuge deaerating of food compositions. The centrifuge includes an outer shell 31, feed inlet 32, vacuum line 33, and discharge line 34. The basket 9 is mounted for rotation on a shaft 35 which is driven by motor 36 at about 1800 r.p.m. The basket includes a plurality of perforated rings 10 which intercept liquid centrifuged in the machine and disperse it in the form of fine drops. Thus, as the grain alcohol passes through the basket, it is subjected to multiple impingements to effect dispersions of the alcohol. The perforated rings can be about 9 in number, spaced ¾ inch apart, having 7/64 inch perforations which are staggered on 5/32 inch centers. The overall diameter of the rotor can be about 20 inches. Suitable flow rates of grain alcohol through this centrifugal vacuum purifier are up to 40 g.p.m.

*Example*

Grain neutral spirits is diluted from 190–192 proof to 110 proof and is passed at 25° C. at a rate of 40 g.p.m. to a centrifugal vacuum purifier according to FIG. 2 and wherein it is centrifuged at about 1800 r.p.m. The liquid effluent leaving the purifier via line 34 is little less than the 40 g.p.m. introduced into the purifier, since material leaving as gas through the vacuum line 33 is not substantial in amount. The evolved gas can be discarded or treated for recovery of values thereof. The pressure (absolute) maintained in the purifier is about 10 inches of mercury. The liquid effluent is pumped through a series connected battery of sorption chambers filled with charcoal for contacting in known manner. The contacting with charcoal is at 20–30° C. and atmospheric pressure plus the head loss through the beds and is continued for several hours. Upon leaving the charcoal beds, the alcohol is filtered and diluted as necessary to obtain the desired proof, all in known manner.

Alternatively, the liquid effluent from the centrifugal vacuum purifier can be contacted with charcoal by batch operation wherein charcoal is dispersed in the centrifuged alcohol and the alcohol-charcoal mixture is agitated for a period of hours, and is then filtered to provide the alcohol for dilution to the desired proof.

The effectiveness of the procedure of the invention, in practice, is proved by improvement in taste, which is a reduction in taste so that the vodka is more nearly tasteless. For a typical run according to the invention and employing contacting with charcoal in sorption chambers, vodka produced was compared organoleptically by 8 experts with vodka produced in the same way except without the centrifugal vacuum purification, and was found by 6 experts to have a significantly improved taste.

Pressure is expressed in the application and in the appended claims in absolute units.

While the invention has been described with reference to particular embodiments thereof, various modifications and alternatives will occur to those skilled in the art, and it is intended to secure all such variations as are within the scope of the appended claims.

What is claimed is:

1. The method of treating grain alcohol to remove congenerics therefrom to minify odor, taste, and color thereof which comprises subjecting the grain alcohol to a treatment for removal of high boiling congenerics, and in combination with said treatment, another treatment comprising dispersing the grain alcohol as fine drops while subjecting it to a pressure of about 4–20 inches of mercury, collecting the drops into a liquid body and removing the liquid body from the low pressure zone.

2. In the method of treating grain alcohol to remove congenerics therefrom to minify odor, taste, and color thereof which comprises contacting grain alcohol with charcoal for a time sufficient for removal of congenerics by sorption thereof by the charcoal, the improvement which comprises dispersing the grain alcohol as fine drops while subjecting it to a pressure of about 4–20 inches of mercury.

3. In the method of treating grain alcohol to remove congenerics therefrom to minify odor, taste and color thereof which comprises contacting grain alcohol with activated charcoal at a temperature of about 15–50° C. for removal of congenerics by sorption thereof by the charcoal, the improvement which comprises dispersing the grain alcohol as fine drops while subjecting it to a pressure of about 4–20 inches of mercury, whereby to remove congenerics therefrom.

4. The method of claim 3, wherein the grain alcohol is dispersed as fine drops and subjected as drops to said pressure before said contacting with charcoal.

5. The method of claim 3 wherein the grain alcohol is about 80–110 proof and is subjected as drops to said pressure before said contacting with charcoal.

6. In the method of treating grain alcohol to remove congenerics therefrom to minify odor, taste, and color thereof which comprises contacting grain alcohol with charcoal for a time sufficient for removal of congenerics by sorption thereof by the charcoal, the improvement which comprises centrifuging the grain alcohol while simultaneously dispersing the grain alcohol as fine drops and subjecting it to a pressure of about 4–20 inches of mercury.

7. In the method of treating grain alcohol to remove congenerics therefrom to minify color, taste and color thereof which comprises contacting grain alcohol with activated charcoal at a temperature of about 15–50° C. for a period of hours for removal of congenerics by sorption thereof by the charcoal, the improvement which comprises centrifuging the grain alcohol while simultaneously dispersing the grain alcohol as fine drops and subjecting it to a pressure of about 8–12 inches of mercury, whereby to remove congenerics therefrom.

8. The method of claim 7, wherein the grain alcohol is dispersed as fine drops and subjected as drops to said pressure before said contacting with charcoal.

9. The method of claim 7, wherein the grain alcohol is about 80–110 proof and is subjected as drops to said pressure before said contacting with charcoal.

References Cited in the file of this patent

UNITED STATES PATENTS

| | | |
|---|---|---|
| 1,908,407 | Coupeau et al. | May 9, 1933 |
| 2,507,797 | McMartin | May 6, 1950 |
| 2,586,133 | Wilkin | Feb. 19, 1952 |